United States Patent Office 3,439,805
Patented Apr. 22, 1969

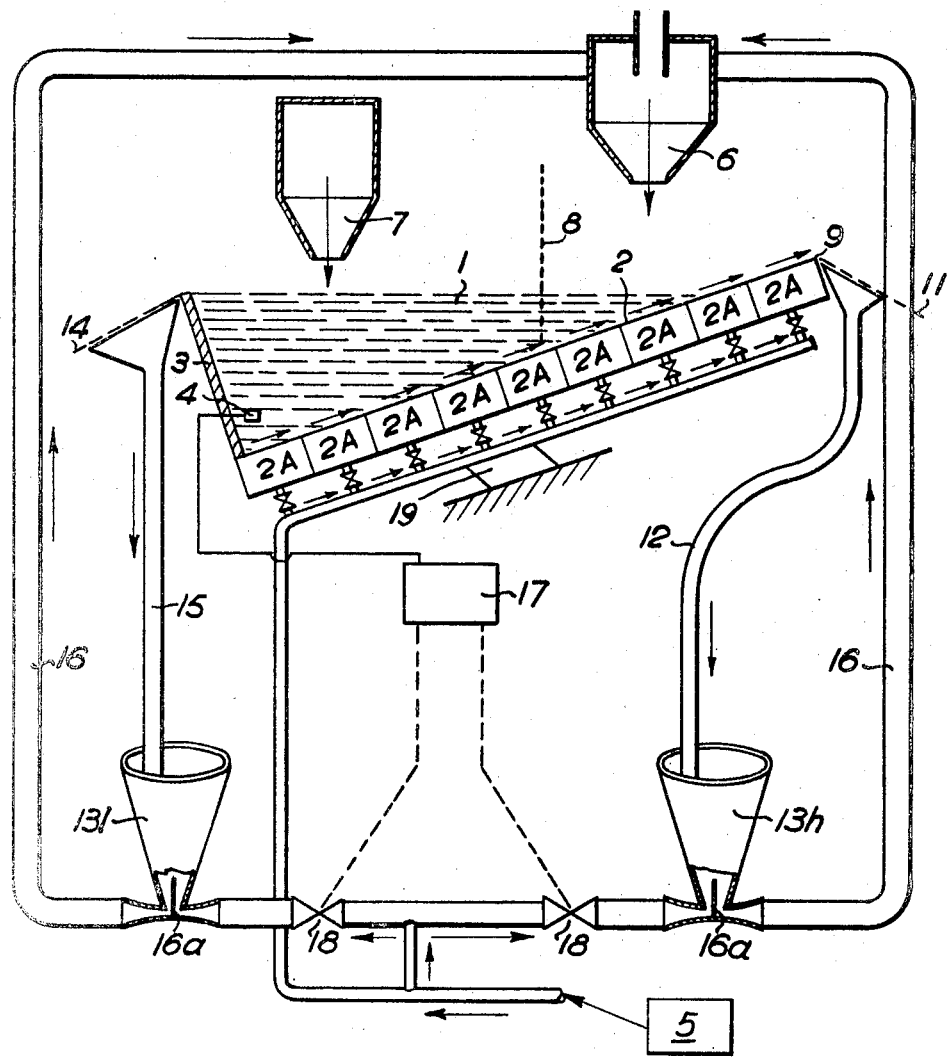

3,439,805
GRAVITY SEPARATION OF PARTICULATE MATERIAL
Terence Walsh, Bromley, England, assignor to National Research Development Corporation, London, England, a body corporate
Filed May 3, 1965, Ser. No. 452,473
Claims priority, application Great Britain, May 6, 1964, 18,878/64
Int. Cl. B03b *3/38*
U.S. Cl. 209—172.5     9 Claims

ABSTRACT OF THE DISCLOSURE

A method and apparatus for gravity separation of particulate material wherein a particulate separation material is separated with the low density and high density product phases. The low density and high density particles of separation medium thus obtained are separated from the low and high density products and are recirculated independently to an extent depending upon the bulk density of the separation chamber. In this manner, deviations in the bulk density of the material in the separation chamber from a desirable norm, are adjusted by regulating the amounts, and the relative amounts, of the low and high density separation medium particles recirculated to the separation chamber.

---

This invention relates to the gravity separation of particulate material such as mineral ores by the aid of a medium consisting of a particulate solid or mixture of solids suspended in fluid and having a bulk density between those of the "sink" and "float" products of the separation. There is a tendency for the particles of the medium to separate with the two fractions of the material being treated, according to shape, density and size, and this tendency is still stronger if the medium includes a mixture of particles of different specific gravity to obtain the required effective specific gravity in the separating environment, and the invention is concerned with maintaining any required effective specific gravity and quantity of particles in the bed of medium in which the separation is effected.

Commonly the medium is a slurry of particles kept suspended in a liquid medium by vibration and/or agitation, but a suspension in a gaseous fluid, usually air, is also used, the separating environment then being a fluidized bed. The invention is applicable to either case.

According to the invention, the respective product fractions leaving the separating environment, which consist of the "sink" and "float" products of separation each with particles from the medium admixed are sifted to separate the particles of medium from the fractions, and these particles are recirculated into the separating environment under a control which is carried out by reference to the effective specific gravity in the environment and adjusts the respective recirculation rates to maintain the effective specific gravity at the desired value. Sifting will effect an adequate degree of separation because the particles used in the medium are graded so that they are all smaller than the particles of the material under treatment.

The two streams of separated medium particles are conveniently continuously recirculated by conveyor means adjusted in correspondence with a density sensing device immersed in the separating environment. The adjustment may be manually effected by reference to a dial on which the sensing device indicates, or preferably automatically from the sensing device. The conveyor means can be a conveyor belt or a helical feeder, or in the case of a medium suspended in a gaseous fluid it can be an air lift in which case the adjustment can be by valve means.

In practice there is a very slight vertical density gradient throughout the bed. If the bed comprises a mixture of materials, the density gradient arises from the partial segregation of light and heavy particles. If the medium is a single material, there will still be a tendency to partial segregation depending on the shape of the particles, since spherical particles tend to sink with respect to any other shape of particle and in effect behave as if of higher density.

The invention enables the bulk density of the bed to be closely controlled, while the recirculation of the medium keeps the loss of medium at a negligible value. This control may be exercised to maintain a particular density within the range which the medium can cover or it may be exercised to effect fractional separation of the treated material at a series of densities within a range.

By way of example, the accompanying drawing is a diagram illustrating the application of the invention to separation of mineral ore particles, using a fluidized bed.

The fluid bed separator 1 comprises a vibrating, slanted porous table 2 with an adjustable weir 3 at the lower end. Air fed into separate chambers 2A at the base of the bed, from a compressed air supply 5 provides the gas to fluidize the solid particles of the medium which are returned to the bed via a cyclone mixer 6. The material to be treated enters from a hopper 7 and a perforated baffle plate 8 located between the cyclone mixer 6 and the hopper 7 extends down into the bed. The perforations while being large enough to permit passage to the particles of the medium are too small to permit passage of the "float" products of separation. Thus, although the recirculation of the medium causes a surface flow of the medium from the point of entry below the hopper 7 towards both ends of the bed, wandering of the "float" products towards the end 9 is checked at the baffle.

The separate chambers 2A enable the pressure at different parts of the bed to be regulated to take account of the different depths of the bed. Heavy minerals in the bed first sink and then progress along the base of the bed under the influence of vibration induced by vibrator 19 to the end 9 remote from the weir 3, together with a proportion of the denser particles of the medium where a screen 11 permits the medium particles to pass through and down a line 12 to a storage receptacle 13*h* while the heavy minerals pass over the screen and collect. This is possible because the mineral particles are always larger than those of the medium.

Light minerals and a proportion of the less dense particles of the medium "float" and are removed and separated at the screen 14 in the same fashion at the weir end of the bed and the particles of the medium pass down a line 15 into another receptacle 13*l*.

From the receptacles 13*h*, 13*l* the respective fractions are recirculated by means of air lifts 16 to the mixer 6 and thence back to the fluidized bed. The air lifts comprise Venturi contractions 16*a* in the air line into which tapering lower portions of the receptacles 13*h*, 13*l* open, the Venturi contractions being proportioned to ensure that the air pressure is always sub-atmospheric at the point of entry of the medium. A density sensing device 4 in the bed responds to any change in effective specific gravity of the bed and is employed to actuate for example (electrically, mechanically, or pneumatically) a controller 17 which in turn controls the recirculation rates of either one or both fractions of the medium through ganged valves 18. By adjusting the valves 18, the rate of air supplied to each fraction through respective valves 18 can be adjusted to change their relative proportions in the bed and consequently the effective specific gravity of the whole bed can be controlled continuously. A rough control of bulk density could be obtained with only one valve 18, but by using two a finer control is possible, and not only can the relative rates be controlled but also the absolute rates.

By regulating the valves 18 of the air lifts in this fashion it is found possible for the bulk density of the bed to be maintained to a high level of accuracy.

Depending on the ore being treated a solid or a mixture of solids with a suitable density has to be chosen to form the fluid bed. Ferrosilicon is available in at least two grades with bulk densities of for example 2.7 and 3.0; by employing a mixture of the two a medium in the fluidized state of density 2.7 to 3.0 may be obtained. Other suitable media and their approximate bulk densities include barytes (2.0), magnetite (2.2), copper powder (4.0), lead powder (4.6–5.0), in fact any fine, closely sized either metallic or non-metallic may be used.

As above mentioned, the invention is also applicable to a bed of a slurry resulting from agitation and fluidization of the solid medium in a liquid, such slurry being chosen in such a way that it provides the required bulk density.

I claim:

1. A process for the gravity separation of particulate feed material comprising the steps of: providing a separation medium in a separation zone, said separation medium comprising a fluid and particulate solid separation medium material and having a bulk density between the bulk densities of the sink and float products of the separation; introducing particulate material to be separated into said separation zone in the presence of said separation medium; removing from said separation zone a float product comprising low density feed material particles and low density separation medium material particles; separating said feed material float product particles from said separation medium material float product articles; removing from said separation zone a sink product comprising high density feed material particles and high density separation medium material particles; separating said feed material sink product particles from said separation medium material sink product particles; recirculating said low density separation medium particles to said separation zone; independently recirculating said high density separation medium particles to said separation zone; regulating the rate of recirculation of said low density separation medium; and independently regulating the rate of recirculation of said high density separation medium particles to control the bulk density of said separation medium in said separation zone.

2. A process as claimed in claim 1 wherein said fluid is a gas.

3. A process as claimed in claim 1 wherein said fluid is a liquid.

4. A process as claimed in claim 1 wherein said particulate solid separation medium material comprises a mixture of materials having different density.

5. A method as claimed in claim 1 including the further step of determining the bulk density of said separation zone, and wherein said recirculation rates are adjusted automatically in dependence on the determined density.

6. Apparatus for effecting gravity separation comprising: a separation chamber; means to detect bulk density in said chamber; means to introduce particulate feed material into said chamber; means to introduce particulate solid separation medium material into said chamber; means to introduce a fluid into said chamber to suspend said feed material particles and said separation medium material particles to provide low density float particles and high density sink particles in said separation chamber; means to remove a low density float particle product from said chamber; means to separate low density feed material particles from low density separation medium particles in said float particles; first conveyor means to recirculate the separated low density separation medium particles to said separation chamber; means to remove high density sink particle product from said chamber; means to separate high density feed material particles from high density separation medium particles in said sink particle product; second conveyor means to recirculate the separated high density separation medium particles to said separation chamber; means to adjust the rate of said first conveyor means in response to the bulk density of said chamber; and means to independently adjust the rate of said second conveyor means in response to the bulk density of said chamber.

7. Apparatus for effecting gravity separation comprising: a fluidized bed separation chamber including a vibratable slanting porous table having a weir at the lower end and a plurality of separate chambers at the base of the bed; cyclone mixer means to introduce solid separation medium particles to said separation chamber towards the upper end of said table; means to supply a fluidizing gas to said separation chamber through said series of separate chambers and said porous table to fluidize said separation medium particles in said separation chamber; means to feed particulate material to be separated to said separation chamber towards the lower end of said table; first screen means to receive a float product overflowing said weir whereby low density feed particles and low density separation medium particles are separated; means to vibrate said porous table to move high density particles along said table towards the upper end thereof; second screen means to receive a sink product overflowing said upper end whereby high density feed particles and high density separation medium particles are separated; first storage means to receive said low density separation medium particles; second storage means to receive said high density separation medium particles; first conveyor means to transport said low density separation medium particles to said cyclone mixer means; second conveyor means to transport said high density separation medium particles to said cyclone mixer means; perforated baffle means located between said cycline mixer means and said particulate material feed means extending downwards into said fluidized bed, the perforations of which are sized to prevent passage of said low density feed material towards said upper end of said table while permitting the passage of separation medium; first regulator means to regulate the amount of said low density separation medium particles transported to said cyclone mixer means by said first conveyor means; second regulator means to regulate the amount of said high density separation medium particles transported to said cyclone mixer means by said second conveyor means; density sensing means in the fluidized bed responsive to changes in the bulk density thereof; and means to adjust said first and second regulator means to maintain the bulk density of said fluidized bed at a predetermined value.

8. Apparatus according to claim 7 wherein said first and second conveyor means each comprise air lift means and wherein said first and second regulator means each comprise valve means controlling the amount of air supplied to each of said air lifts.

9. Apparatus according to claim 8 wherein said valve means comprise ganged valves.

References Cited

UNITED STATES PATENTS

| | | | |
|---|---|---|---|
| 2,303,367 | 12/1942 | Kendall | 209—466 |
| 2,474,774 | 6/1949 | Bean | 209—172.5 |
| 2,877,896 | 3/1959 | Jones | 209—172.5 |

FRANK W. LUTTER, *Primary Examiner.*

U.S. Cl. X.R.

209—467, 502